United States Patent
Chen

(10) Patent No.: US 6,636,977 B1
(45) Date of Patent: Oct. 21, 2003

(54) CONTROL DEVICE FOR USE IN A POWER SUPPLYING APPARATUS INCLUDING MULTIPLE PROCESSORS ADAPTED TO PERFORM SEPARATE FUNCTIONS ASSOCIATED WITH STATUS MONITORING AND LOAD BALANCING

(75) Inventor: Tsung-Chun Chen, Taipei Hsien (TW)

(73) Assignee: Shin Jiuh Corp., Hsin-Tien (TW)

( * ) Notice: Subject to any disclaimer, the term of this patent is extended or adjusted under 35 U.S.C. 154(b) by 0 days.

(21) Appl. No.: 09/265,447

(22) Filed: Mar. 10, 1999

(51) Int. Cl.[7] .............................. G06F 1/26; G06F 1/28
(52) U.S. Cl. ........................................ 713/340; 713/300
(58) Field of Search ................................ 713/300, 310, 713/340; 714/2, 10, 14

(56) References Cited

U.S. PATENT DOCUMENTS

| | | | | |
|---|---|---|---|---|
| 4,817,091 A | * | 3/1989 | Katzman et al. ............. | 714/8 |
| 5,311,392 A | * | 5/1994 | Kinney et al. ............. | 361/93.2 |
| 5,928,368 A | * | 7/1999 | Jardine et al. ............. | 714/22 |
| 6,081,437 A | * | 6/2000 | Chen et al. ............. | 363/70 |
| 6,316,956 B1 | * | 11/2001 | Oglesbee ............. | 326/10 |
| 6,360,333 B1 | * | 3/2002 | Jansen et al. ............. | 714/25 |
| 6,370,657 B1 | * | 4/2002 | Jansen et al. ............. | 714/23 |
| 6,496,342 B1 | * | 12/2002 | Horvath et al. ............. | 361/65 |

* cited by examiner

Primary Examiner—Thomas Lee
Assistant Examiner—Paul Yanchus, III
(74) Attorney, Agent, or Firm—Birch, Stewart, Kolasch & Birch, LLP

(57) ABSTRACT

A multi-processor control device is adapted for use in a power supplying apparatus having a plurality of power supplying units, and includes at least two separate processors adapted to be connected to the power supplying units, and an alarm generator connected to the processors. The processors are adapted to jointly perform control functions associated with status monitoring and load balancing control of the power supplying units. The processors are connected to each other and further perform a continuous verification operation, in which signal exchange between the processors is continuously executed to enable each of the processors to verify whether or not other ones of the processors are operating normally. Each of the processors is capable of generating a warning signal in the event that any one of the processors fails to respond thereto due to malfunctioning of the latter. The alarm generator is activated by the warning signal from any of the processors so as to generate a warning output.

8 Claims, 2 Drawing Sheets

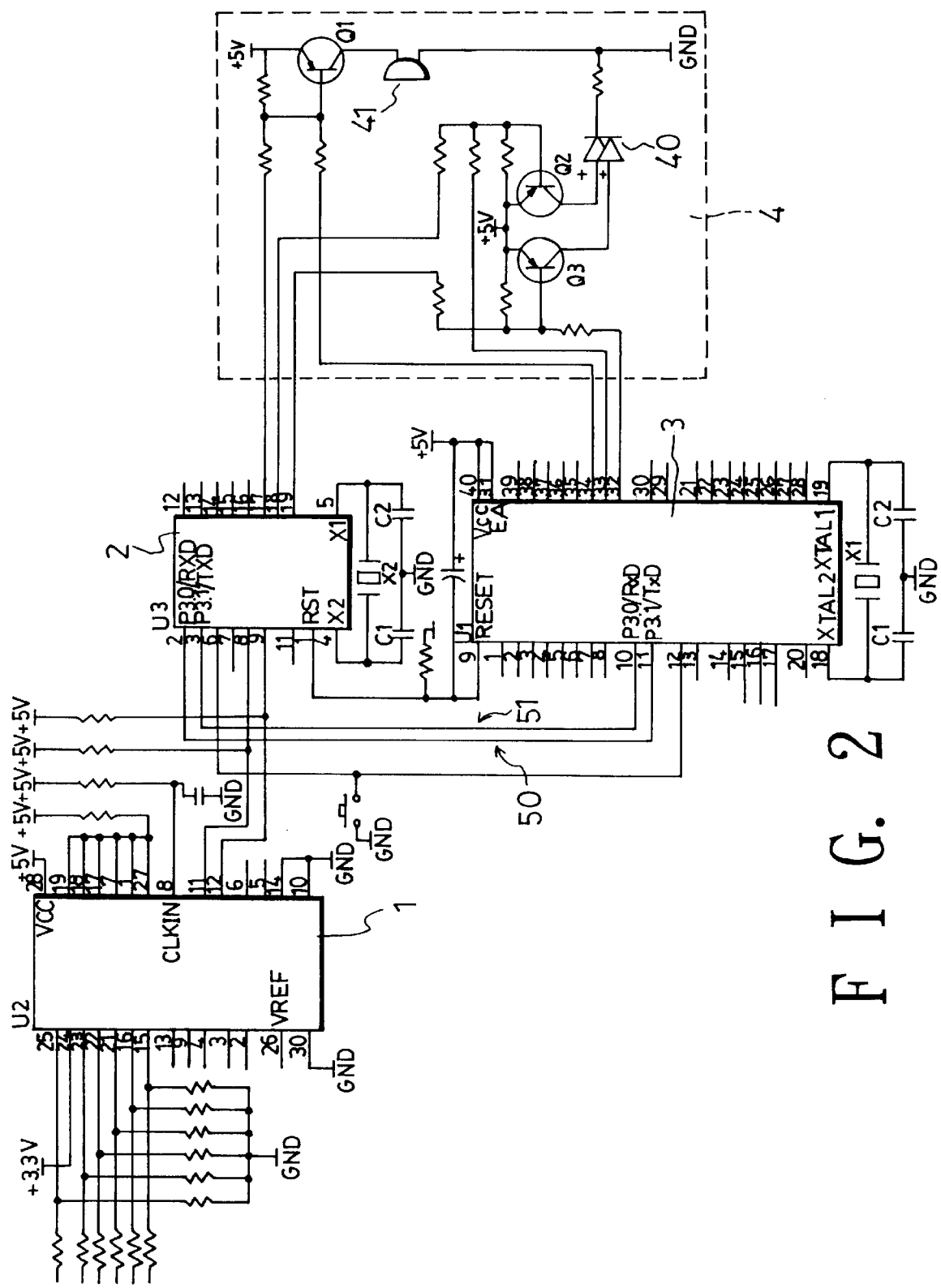
F I G. 2

CONTROL DEVICE FOR USE IN A POWER SUPPLYING APPARATUS INCLUDING MULTIPLE PROCESSORS ADAPTED TO PERFORM SEPARATE FUNCTIONS ASSOCIATED WITH STATUS MONITORING AND LOAD BALANCING

BACKGROUND OF THE INVENTION

1. Field of the Invention

The invention relates to a control device adapted for use in a power supplying apparatus, more particularly to a multi-processor control device including at least two separate processors that are assigned to perform different sets of control functions. When one of the processors malfunctions, the other processors continue to work to resume operation of the power supplying apparatus. At the same time, the other processors activate an alarm generator to warn a system manager of the occurrence of a malfunction.

2. Description of the Related Art

Presently, the power supplying apparatus installed in a large target system (such as a network server) is usually connected to a main board of the target system by a power cable, thereby enabling the power supplying apparatus to provide operating power to the target system. The conventional power supplying apparatus installed in the large target system generally includes a plurality of power supplying units that are connected in parallel. Each power supplying unit includes a power converting circuit for converting an alternating current (AC) input into a direct current (DC) output that is provided to the target system and to a heat dissipating fan of the power supplying unit. The internal circuitry of the power supplying units is known to those skilled in the art and will not be described further. The power supplying apparatus further includes a control circuit board connected to the power supplying units. A detecting and alarm generating circuit on the control circuit board detects whether or not the power supplying units are functioning properly, and generates an alarm output upon detecting that any one of the power supplying units is malfunctioning. A protecting circuit detects whether or not the output voltages of the power supplying units are in a predetermined normal range, and disables the power supplying unit with the output voltage that is excessively high or excessively low. A load balancing circuit is employed to balance the power load of the power supplying units. Some conventional power supplying apparatus employ analog circuits to perform the aforesaid functions of detecting and alarm generating, over-voltage and under-voltage protection, and load balancing control. Other conventional power supplying apparatus employ digital means, such as a single microprocessor, to perform the same functions.

It is noted that the advantage of a simple circuit construction arises when a single microprocessor is used to perform the aforesaid functions instead of a number of analog circuits. However, when the single microprocessor is unable to work properly, all of the functions, such as detecting and alarm generating, over-voltage and under-voltage protection, and load balancing control, that are associated with the single microprocessor will be suspended. Such a condition will have an adverse effect on the target system, and can lead to data loss.

SUMMARY OF THE INVENTION

Therefore, the main object of the present invention is to provide a multi-processor control device including at least two separate processors that are assigned to perform different sets of control functions. When one of the processors malfunctions, the other processors continue to work to resume operation of a power supplying apparatus that incorporates the control device. At the same time, the other processors activate an alarm generator to warn a system manager of the occurrence of a malfunction so that the appropriate action can be done.

According to the present invention, a multi-processor control device is adapted for use in a power supplying apparatus that includes a plurality of power supplying units, and comprises:

at least two separate processors adapted to be connected to the power supplying units, the processors being adapted to jointly perform control functions associated with status monitoring and load balancing control of the power supplying units, the processors being connected to each other and further performing a continuous verification operation, in which signal exchange between the processors is continuously executed to enable each of the processors to verify whether or not other ones of the processors are operating normally, each of the processors being capable of generating a warning signal in the event that any one of the processors fails to respond thereto due to malfunctioning of the latter; and an alarm generator connected to the processors and activated by the warning signal from any of the processors so as to generate a warning output.

In the preferred embodiment, an analog-to-digital converting circuit is connected to the processors and is adapted to be connected to the power supplying units. The analog-to-digital converting circuit is adapted to convert analog voltage outputs of the power supplying units into corresponding digital signals that are provided to the processors.

The processors include a load balancing processor and a status monitoring processor. The load balancing processor is adapted to control the power supplying units so as to balance power load of the same in accordance with the digital signals received from the analog-to-digital converting circuit. The status monitoring processor is operable so as to perform at least one of detecting output voltages and operating temperatures of the power supplying units, detecting whether or not the power supplying units are functioning properly and generating an alarm output upon detecting that any one of the power supplying units is malfunctioning, and protecting the power supplying units by disabling one of the power supplying units having the output voltage that is not within a predetermined normal range.

BRIEF DESCRIPTION OF THE DRAWINGS

Other features and advantages of the present invention will become apparent in the following detailed description of the preferred embodiment with reference to the accompanying drawings, of which:

FIG. 2 is a schematic electrical circuit diagram of the preferred embodiment.

DETAILED DESCRIPTION OF THE PREFERRED EMBODIMENT

Figure 1:
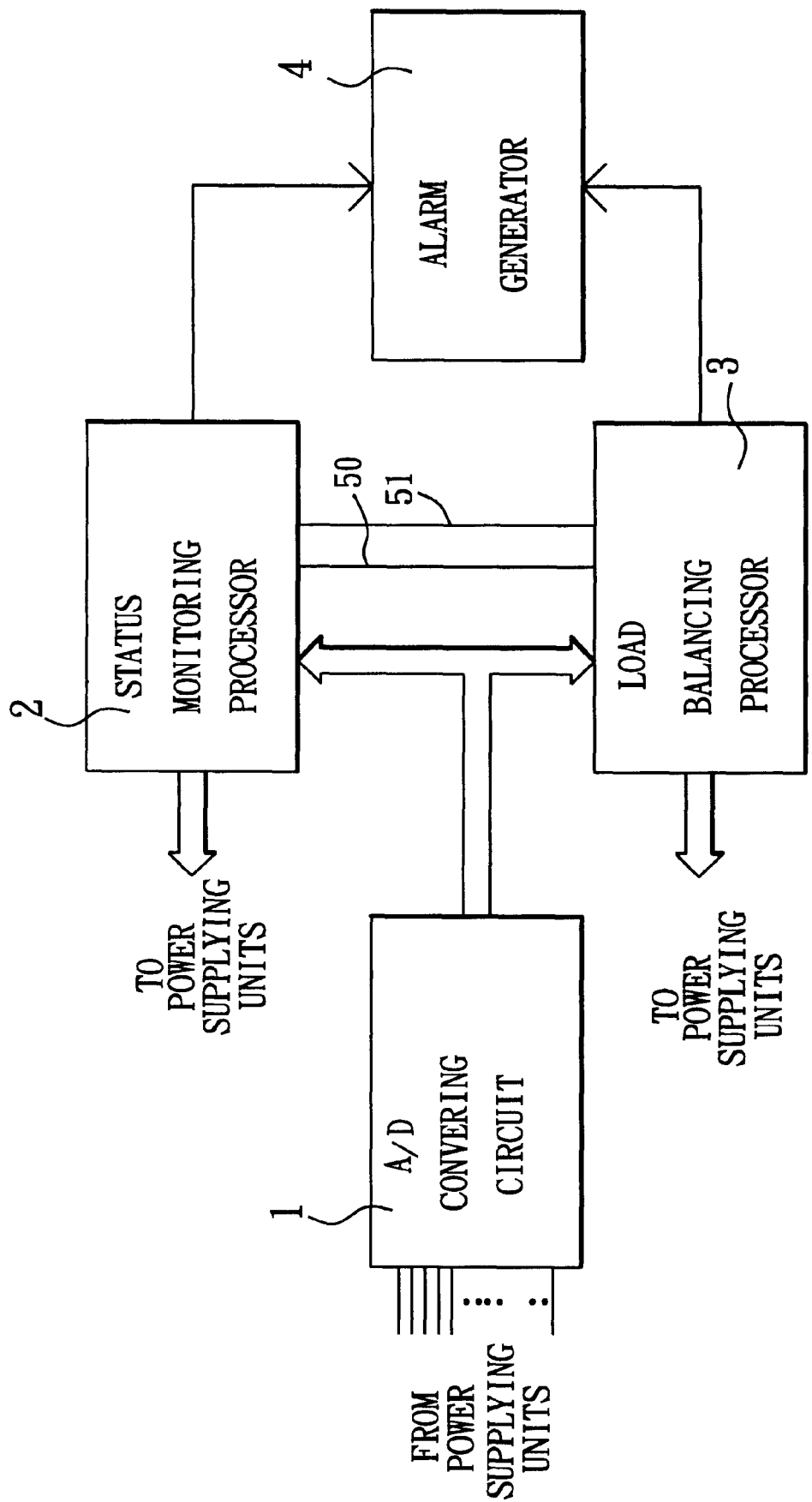
FIG. 1 is a schematic circuit block diagram illustrating the preferred embodiment of a multi-processor control device for a power supplying apparatus according to the present invention.

The preferred embodiment of a multi-processor control device according to the present invention is adapted for use in a power supplying apparatus that is commonly installed in a large target system (such as a network server) to provide operating power to the same. The power supplying apparatus generally includes a plurality of power supplying units that are connected in parallel. The multi-processor control device is adapted to be connected to the power supplying units. Each power supplying unit includes a power converting circuit for converting an alternating current (AC) input into a direct current (DC) output that is provided to the target system and to a heat dissipating fan of the power supplying unit. Since the feature of the invention is not directed to the internal circuitry of the power supplying unit, which is known to those skilled in the art, a detailed description of the same will be dispensed with herein for the sake of brevity.

With reference to FIGS. 1 and 2, the preferred embodiment of the multi-processor control device of this invention is to be provided on a control circuit board and is shown to comprise an analog-to-digital converting circuit 1, two or more processors 2, 3, and an alarm generator 4.

The analog-to-digital (A/D) converting circuit 1 is adapted to be connected to the power converting circuits (not shown) of the power supplying units, and is adapted to convert analog voltage outputs of the latter into corresponding digital signals.

The processors 2, 3 are adapted to be connected to the power supplying units, and are adapted to jointly perform control functions associated with status monitoring and load balancing control of the power supplying units. In this embodiment, each of the processors 2, 3 is assigned to perform a specific set of control functions between the power supplying units and the target system. In this embodiment, there are two separate processors, including a status monitoring processor 2 and a load balancing processor 3, that are respectively assigned with status monitoring and load balancing control functions between the power supplying units and the target system. Preferably, the status monitoring processor 2 is an 89C2051 processing chip, while the load balancing processor 3 is an 89C51 processing chip. As shown in FIG. 2, pins 2 and 3 of the status monitoring processor 2 are connected to pins 10 and 11 of the load balancing processor 3 via two transmission wires 50, 51. Thus, signal exchange between the processors 2, 3 is permitted via the transmission wires 50, 51 in order to enable each processor 2, 3 to verify continuously whether or not the other processor 2, 3 operates normally. During the continuous verification operation, in the event that one of the processors 2, 3 fails to respond to the other one of the processors 2, 3, indicative of a condition in that said one of the processors 2, 3 is malfunctioning, the other one of the processors 2, 3 will generate a warning signal. The load balancing processor 3 is connected to the A/D converting circuit 1 so as to receive the digital signals therefrom. The load balancing processor 3 is adapted to be connected to and control the power supplying units so as to balance power load of the latter in a known manner according to the digital signals from the A/D converting circuit 1. The status monitoring processor 2 is also connected to the A/D converting circuit 1 so as to receive the digital signals therefrom. The status monitoring processor 2 is operable so as to perform at least one of detecting output voltages and operating temperatures of the power supplying units, detecting whether or not the power supplying units are functioning properly and generating an alarm output upon detecting that any one of the power supplying units is malfunctioning, and protecting the power supplying units by disabling the power supplying unit having the output voltage that is not within a predetermined normal range.

The alarm generator 4 includes a light indicator 40, such as a light emitting diode, and a sound generator 41, such as a buzzer. The light indicator 40 is connected to a pair of transistors (Q2), (Q3). The sound generator 41 is connected to a transistor (Q1). The transistor (Q1) is connected to the status monitoring processor 2 and the load balancing processor 3, and is activated by the warning signal from any one of the processors 2, 3 so as to enable the sound generator 41 to generate a warning sound output. The transistor (Q2) is activated by the warning signal from the status monitoring processor 2 so as to enable the light indicator 40 to generate a warning light output. The transistor (Q3) is activated by the warning signal from the load balancing processor 3 so as to enable the light indicator 40 to generate the warning light output.

By virtue of the warning sound output of the sound generator 41 and the warning light output of the light indicator 40, a system manager is informed as to the occurrence of a malfunction in the control device of this invention so that timely replacement of the control device can be performed. This is not possible if only a single microprocessor is employed to perform all of the aforesaid control functions as taught in the prior art since, when the single microprocessor is unable to work properly, all of the control functions that are associated with the single microprocessor will be suspended, thereby resulting in an adverse effect on the target system and in possible loss of data.

It has thus been shown that the multi-processor control device of this invention, which includes at least two separate processors that are assigned to perform different sets of control functions, permits operation of a power supplying apparatus even when one of the processors is malfunctioning. At the same time, the other processors activate an alarm generator to warn a system manager of the occurrence of a malfunction so that timely replacement of the control device can be performed. The object of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A multi-processor control device adapted for use in a power supplying apparatus that includes a plurality of power supplying units, said multi-processor control device comprising:

at least two separate processors adapted to be connected to the power supplying units, said processors being adapted to jointly perform separate control functions associated with status monitoring and load balancing control of the power supplying units, said processors being connected to each other and further performing a continuous verification operation, in which signal exchange between said processors is continuously executed to enable each of said processors to verify whether or not other said processors are operating normally, each of said processors being capable of generating a warning signal in the event that any one of said processors fails to respond thereto due to malfunctioning of any one of said processors;

an alarm generator connected to said processors and activated by the warning signal from any of said processors so as to generate a warning output; and an analog-to-digital converting circuit connected to said processors and adapted to be connected to the power supplying units, said analog-to-digital converting circuit being adapted to convert analog voltage outputs of the power supplying units into corresponding digital signals that are provided to said processors, wherein said processors include a load balancing processor adapted to control the power supplying units so as to balance power load of the power supplying units in accordance with the digital signals received from said analog-to-digital converting circuit.

2. The multi-processor control device according to claim 1, wherein said processors further include a status monitoring processor operable so as to perform at least one of detecting output voltages and operating temperatures of the power supplying units, detecting whether or not the power supplying units are functioning properly and generating an alarm output upon detecting that any one of the power supplying units is malfunctioning, and protecting the power supplying units by disabling one of the power supplying units having the output voltage that is not within a predetermined normal range.

3. The multi-processor control device according to claim 1, wherein said alarm generator includes at least one of a light indicator and a sound generator.

4. The multi-processor control device according to claim 2, wherein said alarm generator includes at least one of a light indicator and a sound generator.

5. The multi-processor control device according to claim 4, wherein said status monitoring processor includes an 89C2051 processing chip, said status monitoring processor being operatively connected to said alarm generator, to said power supplying units and to said load balancing processor.

6. The multi-processor control device according to claim 4, wherein said load balancing processor includes an 89C51 processing chip, said load balancing processor being operatively connected to said alarm generator, to said power supplying units and to said status monitoring processor.

7. The multi-processor control device according to claim 5, wherein said load balancing processor includes an 89C51 processing chip, said load balancing processor being operatively connected to said alarm generator, to said power supplying units and to said status monitoring processor.

8. The multi-processor control device according to claim 7, wherein said light indicator includes a light emitting diode and said sound generator includes a buzzer.

* * * * *